March 18, 1958     R. T. CLOUD     2,827,604
NULL DETECTING SYSTEM FOR PENDULUMS AND SIMILAR DEVICES
Filed Dec. 11, 1956
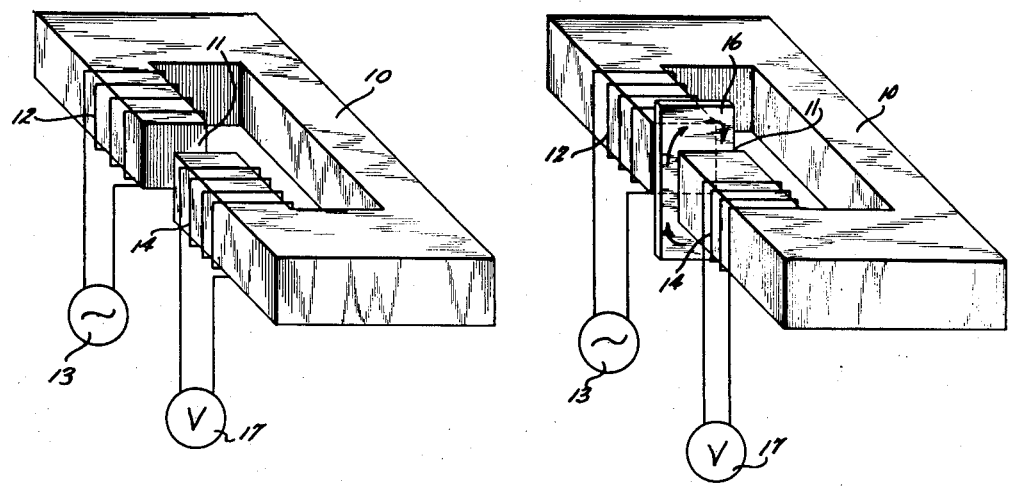
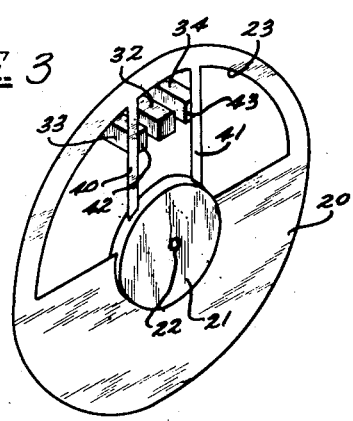
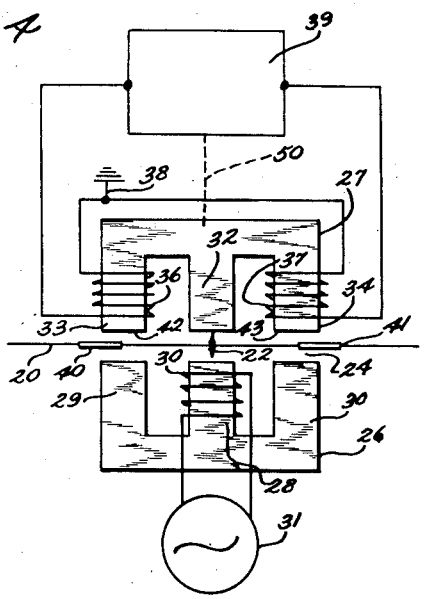
Inventor
RAYMOND T. CLOUD

United States Patent Office 2,827,604
Patented Mar. 18, 1958

2,827,604

NULL DETECTING SYSTEM FOR PENDULUMS AND SIMILAR DEVICES

Raymond T. Cloud, Houston, Tex., assignor to North American Geophysical Co., Houston, Tex., a corporation of Texas Application December 11, 1956, Serial No. 627,602

8 Claims. (Cl. 318—31)

This invention relates generally to detecting systems and more particularly relates to a detecting system for a pendulum, a gyro or other follow-up device which utilizes novel method and means for generating an error voltage differential for use as a controlling variable by changing the proportion of current-flux linkage in a pair of secondaries of a magnetic transducer.

All previous serious attempts to use a pendulum for a vertical reference source have utilized photoelectric cells in a light source so as to not affect the position of the pendulum or the condition-sensitive device. Photocells, however, vary in characteristics with temperature and age. Moreover, light sources are also subject to deterioration. The electrical circuitry associated with such devices is also complicated and large amounts of amplification are required. Additional problems are presented in that the output impedance of photocells is high and photocells are also affected by magnetic and electrostatic fields. Accordingly, shielding is necessary to protect photocells from both magnetic and electrostatic fields.

It is an object of the present invention, therefore, to provide a detecting system for a pendulum, gyro or other follow-up device which places little or no restraint on the condition-sensitive member.

Yet another object of the present invention is to provide a detecting system which is not required to utilize magnetic material on the movable element of the system so that the device will be unaffected by residual magnetic forces.

A still further object of the present invention is to provide a sensitive detector of low impedance that will not adversely affect the movable element of a null detecting system.

Still another object of the present invention is to provide detecting means for a null system superior to photoelectric devices and operatively independent of temperature variations.

A further object of the present invention is to provide detecting means which are unaffected by temperature or age.

Many other features, advantages and additional objects of the present invention will become manifest to those versed in the art upon making reference to the detailed description which follows and the accompanying sheet of drawings in which a preferred structural embodiment of my invention is disclosed by way of illustrative example.

As shown on the drawings:

Figures 1 and 2 are somewhat diagrammatic in character and illustrate magnetic induction apparatus which is exemplary of the basic principles involved in connection with the practice of the novel methods disclosed herein and the apparatus provided for practicing such novel methods;

Figure 3 is a fragmentary perspective view of an exemplary form of pendulum construction embodying the principles of the present invention and illustrating the relationship of the pendulum disk with respect to a portion of the magnetic structure of a magnetic transducer; and Figure 4 is a somewhat diagrammatic view illustrating additional details of construction of magnetic apparatus incorporating the principles of the present invention.

As shown on the drawings:

It will be understood that the principles of the present invention are of general applicability to any null detecting system whether that detecting system incorporate a pendulum, a gyro or some other form of follow-up device.

Generally, the present invention exploits a physical phenomenon which is sometimes expressed as Lenz' law which in effect says: in all cases of electromagnetic induction, the induced voltages have a direction such that the currents which they produce oppose the effect which produces them. Thus, when an electromotive force is induced in a conductor by any change in the relation between the conductor and the magnetic field, the direction of the electromotive force is such as to produce a curernt whose magnetic field will oppose the change.

That principle is illustrated by the electromagnetic induction apparatus shown in Figures 1 and 2. For example, in Figure 1 a magnetic circuit is indicated at 10 with an air gap at 11. A first conductor constituting a primary winding 12 is excited by an alternating current generator 13, thereby causing a current to flow through the conductor 12. As is well known, if a current flows in a conductor, a magnetic flux is set up about the conductor.

A second conductor taking the form of a secondary winding 14 is inductively coupled to the primary winding 12 so that an electromotive force will be induced in the secondary in proportion to the rate of change of the magnetic flux across the air gap 11.

If an electrically conductive sheet 16 is placed in the air gap 11, as is illustrated in Figure 2, the alternating magnetic flux will induce eddy currents in the sheet which will flow as indicated by the arrows on the sheet 16 in Figure 2. In accordance with Lenz' law, the magnetic flux produced by such eddy current will oppose the flux produced by the current flowing in the primary winding 12. Thus, the flux flowing across the air gap 11 will be reduced with consequent reduction in the voltage produced in the secondary winding, which voltage is indicated as being impressed across a voltmeter 17.

The introduction of the sheet 16 into the air gap 11 can be said to shield or shade the secondary from the primary, even though the sheet 16 is non-magnetic. In other words, the interposition of the sheet 16 changes the flux-current linkages of the magnetic circuit.

In accordance with the principles of the present invention, such phenomena are advantageously exploited in a null detecting system. For purposes of the exemplary disclosure herein set forth, a null detecting system employing a disk-type pendulum will be described.

As shown in Figures 3 and 4, a disk-type pendulum is indicated at 20 and includes a hub portion 21 having pivot mountings 22 for freely suspending the pendulum 20 in a suitable pair of bearings (not shown). The pendulum disk 20 is suitably weighted as by having an aperture 23 formed therein so as to achieve pendulum characteristics and tend to assume a fixed angular relationship with respect to gravitational forces.

The apertured periphery of the pendulum disk 20 is disposed in an air gap 24 of a magnetic transducer apparatus comprising a pair of generally similar magnetic structures indicated generally at 26 and 27, respectively.

The magnetic structure 26 comprises an E-shaped core having a middle leg 28 and end legs 29 and 30 spaced on opposite sides of the middle leg 28. A first conductor constituting a primary winding 30 is disposed on the middle leg. Exciting current is provided for the primary winding 30 by a generator 31.

The magnetic structure 27 comprises an E-shaped core having a middle leg 32 and end legs indicated at 33 and 34, respectively.

Two secondaries are provided, one secondary being shown on each of the corresponding outer legs 33 and 34, these secondaries being indicated at 36 and 37, respectively. The secondaries 36 and 37 are wound in phase opposition with one end of each respective winding connected to ground as at 38 and the other end of each respective winding 36 and 37 connected to a conventional reversible servoamplifier indicated diagrammatically at 39. Thus, when the secondary windings 36 and 37 have equal exposure to the primary 30, the voltages of the secondary windings 36 and 37 are equal and opposite so no voltage differential appears at the servoamplifier 39.

The pendulum 20, in accordance with the principles of the present invention, is particularly characterized by the utilization of two arms or shading vanes indicated at 40 and 41, respectively. As will be noted upon referring to Figures 3 and 4, the shading vanes are constructed and arranged to be interposed between the outside legs 29, 33 and 30, 34 of the magnetic transducer. Furthermore in a normal central position or, in a null position, each corresponding shading vane 40 and 41 shades an equal proportion of a corresponding face on each pole piece. For example, as shown in Figure 4, the face of the pole piece corresponding to the secondary 36 is indicated at 42 and the face of the pole piece corresponding to the secondary winding 37 is indicated at 43. The shading vanes 40 and 41 are illustrated as shading approximately one-half of the face of each pole piece 42 and 43. Since the shading proportion at the null position is equal, the induced voltages in the secondary windings 36 and 37 are equal and opposite.

As the magnetic transducer moves angularly so that the shading vanes 40 and 41 are no longer in a central position corresponding to a null position, one of the shading vanes 40 or 41 will cover more than one-half of the corresponding face 42 or 43, while the other shading pole will cover less than one-half of the corresponding pole face. Accordingly, more voltage will be induced in the secondary winding having the least shaded pole face. There is thus impressed upon the servoamplifier an error voltage differential which can be effectively utilized as a controlling variable.

The servoamplifier 39 is poled so that a servomotor (not shown) will return the transducer to its central or null position with respect to the pole faces. The output of the transducer reverses phase 180° depending upon the direction of displacement with reference to the shading vanes 40 and 41 of the pendulum 20 and imposes no restriction to the zero position of the pendulum 20. It will be understood that the transducer can be mounted on any conventional follow up under the control of the reversible servoamplifier indicated diagrammatically at 39, and in this respect, the operative relationship between the servo system and the trasnducer is indicated diagrammatically by the dotted line connection 50.

Although various minor modifications might be suggested by those versed in the art, it should be understood that I wish to embody within the scope of the patent warranted hereon all such modifications as reasonably and properly come within the scope of my contribution to the art.

I claim as my invention:

1. In a null detecting system, a movable pendulum, a magnetic transducer having at least three wound pole pieces closely spaced to said movable pendulum and including a primary and two secondaries wound in phase opposition, said movable pendulum having a pair of shading vanes disposed to shade one-half of the face of each respective secondary pole piece at a first central position corresponding to a null position, said shading vanes and said transducer being relatively movable away from said central position upon gravitationally induced movements of said pendulum whereupon one of said shading vanes will shade more than one-half of its corresponding pole face and the other of said shading vanes will shade less than one-half of its corresponding pole face, thereby generating more voltage in the least covered pole face, the resulting voltage differential constituting a control variable.

2. In a null detecting system, a magnetic transducer having an air gap and at least three wound pole pieces closely spaced thereto including a primary and two secondaries, said secondaries being wound in phase opposition, a pendulum forming a detecting member in said air gap having a pair of shading vanes disposed to shade a predetermined portion of an adjoining secondary pole face at a null position, said detecting member and said transducer being relatively angularly movable to change the respective proportional shading relationship of said two secondary pole pieces, whereby an increased signal voltage is generated in the least shaded secondary for use as a control variable.

3. In a null detecting apparatus, a first conductor, means to flow current through said first conductor to set up a magnetic flux, a pair of second conductors flux-linked to said current, a pair of shading means to selectively vary the proportion of flux-linkage between said pair of said conductors and a pendulum connected to both of said shading means to simultaneously move both in response to gravitational accelerations as a function of a departure from a null position, thereby to generate an error voltage differential for use as a controlling variable in restoring the apparatus to equilibrium.

4. In a null detecting apparatus having a null system, a first E-shaped core having a primary winding on the middle leg thereof, generating means connected to said primary winding to flow a current therethrough, a second E-shaped core having a secondary winding on each of the outside legs thereof and in mutual phase opposition, said first and second cores being oppositely disposed with respect to one another to form a magnetic transducer and having an air gap between the adjoining pole faces thereof, and a rotatable detecting device in said air gap having a non-magnetic shading vane for the pole face of each secondary winding, said shading vanes shading equal proportions of each corresponding pole face at a first relative position corresponding to a null position, said shading vanes shading unequal proportions of each corresponding pole face at selected second positions corresponding to departures from a null position when said rotatable detecting device is angularly displaced, thereby to generate an error voltage differential in said secondary windings for use as a control variable.

5. In a null detecting apparatus as defined in claim 4, a reversible servoamplifier connected to the secondaries and responsive to said error voltage differential to restore the system to a null position.

6. In a null detecting apparatus having a null system, a first E-shaped core having a primary winding on the middle leg thereof, generating means connected to said primary winding to flow current therethrough, a second E-shaped core having a secondary winding on each of the outside legs thereof and in mutual phase opposition, said first and second cores being oppositely disposed with respect to one another to form a magnetic transducer and having an air gap between their adjoining pole faces, and a disk-type pendulum in said air gap having a pair of parallel spaced apart shading spokes disposed to shade equal proportions of each corresponding secondary pole face at a first null position, said spokes shading unequal proportions of each corresponding secondary pole face at selected different positions corresponding to departures of said pendulum from a null position, thereby to generate an error voltage differential in said secondary windings for use as a controlling variable.

7. In a null detecting apparatus as defined in claim 6, a follow up apparatus on which said transducer is mounted and a reversible servoamplifier in control of said follow up apparatus and connected to said secondaries to restore the transducer to null position.

8. In a null detecting system as defined in claim 2, means forming a servo system including means for mounting the transducer and servoamplifier means in control thereof, said servoamplifier means being connected to said secondaries for response to said signal voltage, whereby said transducer is restored into coincidence with said detecting member in response to said signal voltage.

References Cited in the file of this patent

UNITED STATES PATENTS

| | | |
|---|---|---|
| 2,517,556 | Goertz | Aug. 8, 1950 |
| 2,697,214 | Smith | Dec. 4, 1956 |